(12) United States Patent
Jacquin et al.

(10) Patent No.: US 12,072,990 B2
(45) Date of Patent: Aug. 27, 2024

(54) MULTIPLE PHYSICAL REQUEST INTERFACES FOR SECURITY PROCESSORS

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Nigel J. Edwards, Bristol (GB); Thomas M. Laffey, Roseville, CA (US); Shiva R. Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 518 days.

(21) Appl. No.: 17/451,829

(22) Filed: Oct. 22, 2021

(65) Prior Publication Data

US 2023/0129610 A1    Apr. 27, 2023

(51) Int. Cl.
| | |
|---|---|
| G06F 21/60 | (2013.01) |
| G06F 21/57 | (2013.01) |
| G06F 21/85 | (2013.01) |

(52) U.S. Cl.
CPC .......... *G06F 21/606* (2013.01); *G06F 21/572* (2013.01); *G06F 21/85* (2013.01)

(58) Field of Classification Search
None
See application file for complete search history.

(56) References Cited

U.S. PATENT DOCUMENTS

| | | | |
|---|---|---|---|
| 5,692,193 A | 11/1997 | Jagannathan et al. | |
| 7,392,403 B1 | 6/2008 | Munetoh | |
| 7,478,246 B2 | 1/2009 | Arndt et al. | |
| 7,484,099 B2 | 1/2009 | Bade et al. | |
| 7,624,283 B2 | 11/2009 | Bade et al. | |
| 7,900,058 B2 | 3/2011 | Mabayoje et al. | |
| 8,108,668 B2 | 1/2012 | Rozas | |
| 9,413,765 B2 | 8/2016 | Swanson et al. | |
| 2006/0026422 A1 | 2/2006 | Bade et al. | |
| 2008/0016334 A1* | 1/2008 | Kurapati | H04L 63/061 |
| | | | 713/155 |

(Continued)

*Primary Examiner* — Nelson S. Giddins
(74) *Attorney, Agent, or Firm* — Trop, Pruner & Hu, P.C.

(57) ABSTRACT

A process includes a first tenant of a plurality of tenants communicating with a security processor of a computer platform, via a first physical request interface of the security processor, to acquire ownership of a first command execution engine of the security processor associated with the first physical request interface. The process includes a second tenant of the plurality of tenants communicating with the security processor, via a second physical request interface of the security processor, to acquire ownership of a second command execution engine of the security processor associated with the second physical request interface. The process includes the security processor receiving a first request from the first tenant in the first physical interface, and the second processor receiving a second request from the second tenant in the second physical request interface. The process includes, pursuant to block, the first command execution engine processing the first request and the second command execution engine processing the second request to perform corresponding trusted computing operations.

20 Claims, 9 Drawing Sheets

(56) References Cited

U.S. PATENT DOCUMENTS

| | | | |
|---|---|---|---|
| 2009/0144472 A1* | 6/2009 | Montgomery | G06F 21/85 |
| | | | 710/261 |
| 2016/0078253 A1* | 3/2016 | Frank | G06F 12/1408 |
| | | | 726/26 |
| 2018/0060077 A1 | 3/2018 | Abdulhamid et al. | |
| 2021/0089357 A1* | 3/2021 | Garaga | G06F 12/0848 |
| 2023/0020841 A1* | 1/2023 | Benoit | G06F 21/72 |

* cited by examiner

MULTIPLE PHYSICAL REQUEST INTERFACES FOR SECURITY PROCESSORS

BACKGROUND

A computer platform may be subject to a security attack in which a rogue entity seeks to access information that is stored on the computer platform or harm components of the computer platform. For purposes of preventing security attacks or at least inhibiting the degree of potential harm inflicted by security attacks, the computer platform may have different levels of protection. For example, the computer platform may have various mechanisms to limit access, such as firewalls, passwords, keys, and so forth. As another example, the computer platform may have a secure cryptographic processor, which may provide a number of security-related features for the computer platform. The security-related features may, for example, be used to ensure that the computer platform consistently behaves in expected ways and prove that the computer platform is trustworthy.

DETAILED DESCRIPTION

Figure 1:
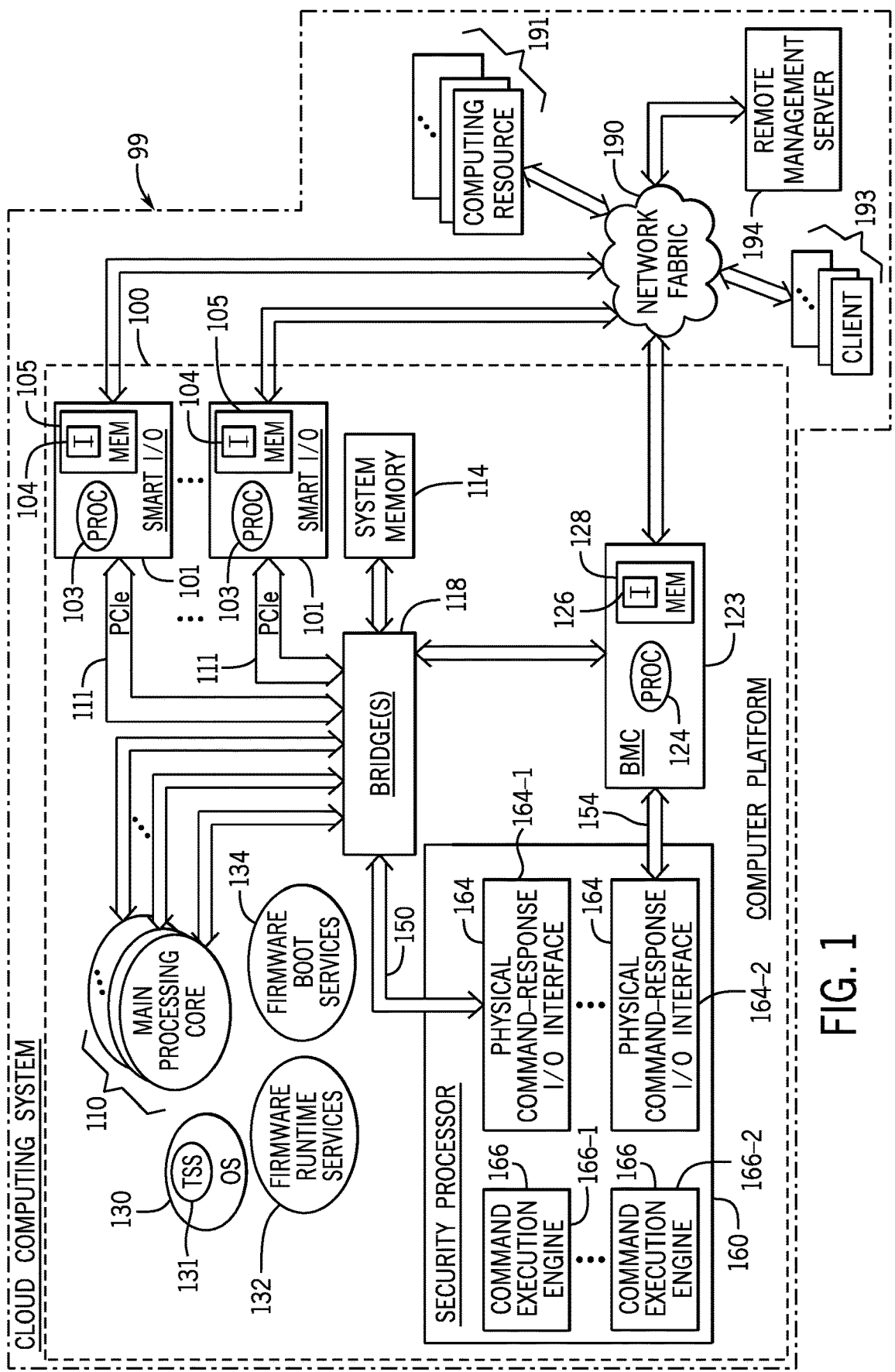
FIG. 1 is a schematic diagram of a computer system having a security processor that includes multiple physical command-response input/output (I/O) interfaces for tenants of the security processor according to an example implementation.

A secure cryptographic processor, or security processor, for a computer platform may provide trusted computing operations for the computer platform for purposes of ensuring that the computer platform consistently behaves in expected ways. As examples of trusted computing operations, the security processor may generate cryptographic keys; store security artifacts (e.g., cryptographic keys and certificates); access security artifacts; erase security artifacts; store integrity measurement digests; provide signed integrity measurement digests for remote attestation; encrypt data; decrypt data; seal cryptographic keys to certain integrity measurement digest states (e.g., bind a key encrypting key of a storage device to a set of integrity measurements); unseal cryptographic keys; provide nonces for cryptographic communications; sign certificates; provide random or pseudorandom numbers; and so forth. The trusted computing operations may also include operations to configure the security processor and operations to own the security processor. A trusted platform module, or "TPM," is an example of a security processor.

The security processor may have a physical command-response input/output (I/O) interface for purposes of receiving requests that contain commands for the security processor and providing corresponding responses. In this context, a "physical command-response I/O interface" (also called a "command-response I/O interface" herein) refers to an actual, physical component of the security processor that provides an addressable space for one or multiple tenants of the computer platform to communicate requests to the security and receive corresponding responses from the security processor. As used herein, a "tenant" refers to a user component of the security processor, which is associated with the command-response I/O interface. A "request" refers to a solicitation of an operation to be performed on or by the security processor. A tenant, in connection with submitting a request to the security processor, may be considered a "requestor."

In accordance with example implementations, a request may include such information as a command to be executed by the security processor; one or multiple operands representing parameters associated with the command; and ownership information (described below), establishing the right of the requestor to use the security processor. As examples, a particular request may be directed to a trusted computing operation; setting up an ownership of the security processor; or configuring the security processor. The security processor, in response to a given request, provides an appropriate response, such as an acknowledgement or acceptance of the request; an acknowledgement that the requested action was performed; a denial of the request; a security artifact (e.g., a cryptographic key, a seed, a nonce, a signed measurement digest or certificate); and so forth.

The security processor may have a command execution engine that executes commands that are received through the command-response I/O interface. The execution engine may process one command at a time, and correspondingly, the resources of the security processor may be dedicated to processing one command at a time.

Access to the security processor may be limited for purposes of preventing a rogue entity from accessing secure data or otherwise using the security processor for malicious purposes. For example, one approach may restrict access to the security processor to a single owner at any one time. In this context, the "owner" of the security processor may refer to a tenant that can demonstrate to the security processor that the tenant has possession of an ownership token (e.g., a password or an authorization session). For example, at power up of the security processor, a firmware component of the computer platform, such as a Unified Extensible Firmware Interface (UEFI), may set up an ownership token for the security processor. Requests that are submitted by the UEFI to the security processor may, for example, specify the ownership token or specify a file containing the ownership token to establish the right of the UEFI to use the security processor.

Multiple tenants of the computer platform may use the security processor, in a time-multiplexed manner, by sharing an ownership token or by getting their own ownership token(s). For example, the UEFI may set up an ownership token and with this ownership token, use the security processor in the pre-boot environment of the computer platform (i.e., the environment of the computer platform before control is transferred to the operating system) for boot-related services (e.g., recording measurements as part of a measured boot of the computer platform). The operating system may obtain its own ownership token so that the operating system and applications may submit requests to the security processor in the post-boot environment of the computer platform (i.e., the environment of the computer platform after the operating system loads and control is transferred to the operating system).

With the time-multiplexed sharing of the security processor, the security processor executes a single command at a time for a single tenant. Even with the time-multiplexed sharing of the security processor among multiple tenants, this sharing may not be sufficient to accommodate a more modern computer platform architecture which may benefit from the security processor concurrently processing commands for multiple tenants. For example, a computer platform may have a baseboard management controller (BMC) and an operating system, which may both benefit from the concurrent use of the security processor in the post-boot environment of the computer platform.

More specifically, the BMC may be capable of providing one or multiple security-related functions for the computer platform, and these functions may involve commands being processed by the security processor. As examples, the BMC may provide such security-related functions as recording measurements for attestation of the operating system, verifying computer platform hardware, securing out-of-band key or secret distribution, and so forth. One potential approach for the BMC to provide these security-related functions during the post-boot environment may be for the BMC and the operating system to share the security processor. Moreover, in addition to the operating system, there may one or multiple other tenants of the security processor in the post-boot environment of the computer platform, such as the UEFI (as part of the UEFI's platform firmware role). The BMC's shared use of the security processor with one or multiple other tenants in the post-boot environment may present scenarios in which multiple tenants may concurrently have commands for the security processor to process. Because the security processor is not multi-threaded (i.e., the security process is unable to concurrently process commands for multiple tenants), a denial-of-service situation for the security processor may occur.

In accordance with example implementations, a computer platform includes a multi-threaded security processor, which is capable of processing more than one command at the same time. More specifically, in accordance with example implementations, the security processor includes multiple physical command-response I/O interfaces (also called "command-response I/O interfaces" herein); and each physical command-response I/O interface may be associated with a different command execution engine (or "command processor"). In accordance with example implementations, this security processor architecture allows the security processor to concurrently process commands for multiple tenants at the same time.

In accordance with example implementations, a first physical command-response I/O interface of the security processor may be accessed and used by a tenant that is associated with the main, general purpose processing cores of the computer platform. Commands that are submitted by the tenant via the first command-response I/O interface may, for example, be executed, or processed, by a corresponding first command execution engine of the security processor. Another second command-response I/O interface of the security processor may be accessed and used by a secondary processor-based tenant, such as a BMC of the computer platform. The BMC may submit commands to the security processor via the second command-response I/O interface, and these commands may be executed, or processed, by a second command execution engine of the security processor.

As a more specific example, in accordance with some implementations, a firmware boot services component, such as a UEFI, may in a pre-boot environment of the computer platform, establish ownership of a command execution engine that is associated with a first command-response I/O interface. Establishing the ownership may include the UEFI setting up an ownership token for the command execution engine. Thereafter, the UEFI may use the ownership token to submit requests to the security processor during the pre-boot environment via the first physical command-response I/O interface. The first physical command-response I/O interface may also be used, during the post-boot environment of the computer platform, by the operating system. The operating system may, for example, set up its own ownership token, such that its commands are executed by another command execution engine associated with the first physical command-response I/O interface; or the operating system may use the same ownership token as the UEFI. Security processor requests from the operating system and applications may be submitted by a trusted service stack (TSS) to ensure that one operating system-provided command or application-provided command is submitted to the first command-response I/O interface at a time.

Another component of the computer platform, such as a BMC, may, in the pre-boot environment, establish ownership of a command execution engine that is associated with a second physical command-response I/O interface of the security processor. As part of establishing the ownership, the BMC may set up an ownership token. Thereafter, the BMC may submit requests, via the second physical command-response I/O interface, to the security processor in both the pre-boot and post-boot environments of the computer platform so that the security processor may execute commands for the BMC in both environments.

As a further example, in accordance with some implementations, another tenant, UEFI runtime services, may share the first command-response I/O interface with the operating system and applications in the post-boot environment of the computer platform. For purposes of allowing the security processor to process commands for the operating system and applications concurrently with the processing of commands for the UEFI runtime services, there may be two command execution engines that are associated with the first command-response I/O interface: a first command execution engine (owned by the operating system) to execute commands for the operating system and applications; and a second command execution engine (owned by the UEFI) to execute commands for the UEFI runtime services.

As yet a further example, in accordance with some implementations, instead of the UEFI runtime services sharing the second command-response I/O interface with the operating system and applications, the security processor may contain a third command-response I/O interface that is solely used by UEFI runtime services. For these implementations, the security processor may include a command execution engine that is associated with the third command-response I/O interface, which executes commands received through the third command-response I/O interface.

Example implementations are described herein in which the command-response I/O interfaces are associated with a platform hierarchy of the security processor. The security processor may have hierarchies other than a platform hierarchy, such as an endorsement hierarchy, a storage hierarchy and a null hierarchy. In accordance with further implementations, the security processor may have multiple physical command-response I/O interfaces (and corresponding multiple command execution engines) for a specific hierarchy of the security processor, other than the platform hierarchy. Moreover, in accordance with example implementations, the security processor may have multiple physical command-response I/O interfaces (and corresponding multiple command execution engines) for each hierarchy of multiple hierarchies of the security processor (e.g., multiple physical command-response I/O interfaces and corresponding multiple command execution engines) for a platform hierarchy of the security processor and multiple physical command-response I/O interfaces (and corresponding multiple command execution engines) for an endorsement platform hierarchy of the security processor. Moreover, in accordance with example implementations, the security processor may have multiple physical command-response I/O interfaces (and corresponding multiple command execution engines) for one or multiple hierarchies of the security processor and a single physical command-response I/O interface (and a corresponding command execution engine) for each of the remaining hierarchy(ies) of the security processor.

Referring to FIG. 1, as a more specific example, in accordance with some implementations, a computer platform 100 includes a multi-threaded security processor 160 that has multiple physical command-response I/O interfaces 164 (also called "command-response I/O interfaces 164" herein) that receive requests for multiple tenants of the security processor 160. Although two specific command-response I/O interfaces 164-1 and 164-2 are illustrated in FIG. 1, it is understood that the security processor 160 may include more than two command-response I/O interfaces 164, in accordance with example implementations.

The security processor 160, in accordance with example implementations, may include one or multiple execution processors, or "command execution engines 166," for each command-response I/O interface 164. Although FIG. 1 illustrates two example command execution engines 166-1 and 166-2, in accordance with some implementation, the security processor 160 may have more than two command execution engines 166. The multiple command-response I/O interfaces 164 and multiple command execution engines 166 allows the security processor 160 to accommodate a situation in which multiple tenants may submit requests to the security processor 160 concurrently, such that processing these requests involves the security processor 160 concurrently executing multiple commands. In this context, the security processor 160 "concurrently" executing, or processing, multiple commands refers to the security processor 160 executing a first command of the multiple commands in a first time interval and executing at least one additional command of the multiple commands in a second time interval that at least partially overlaps the first time interval.

Figure 2:
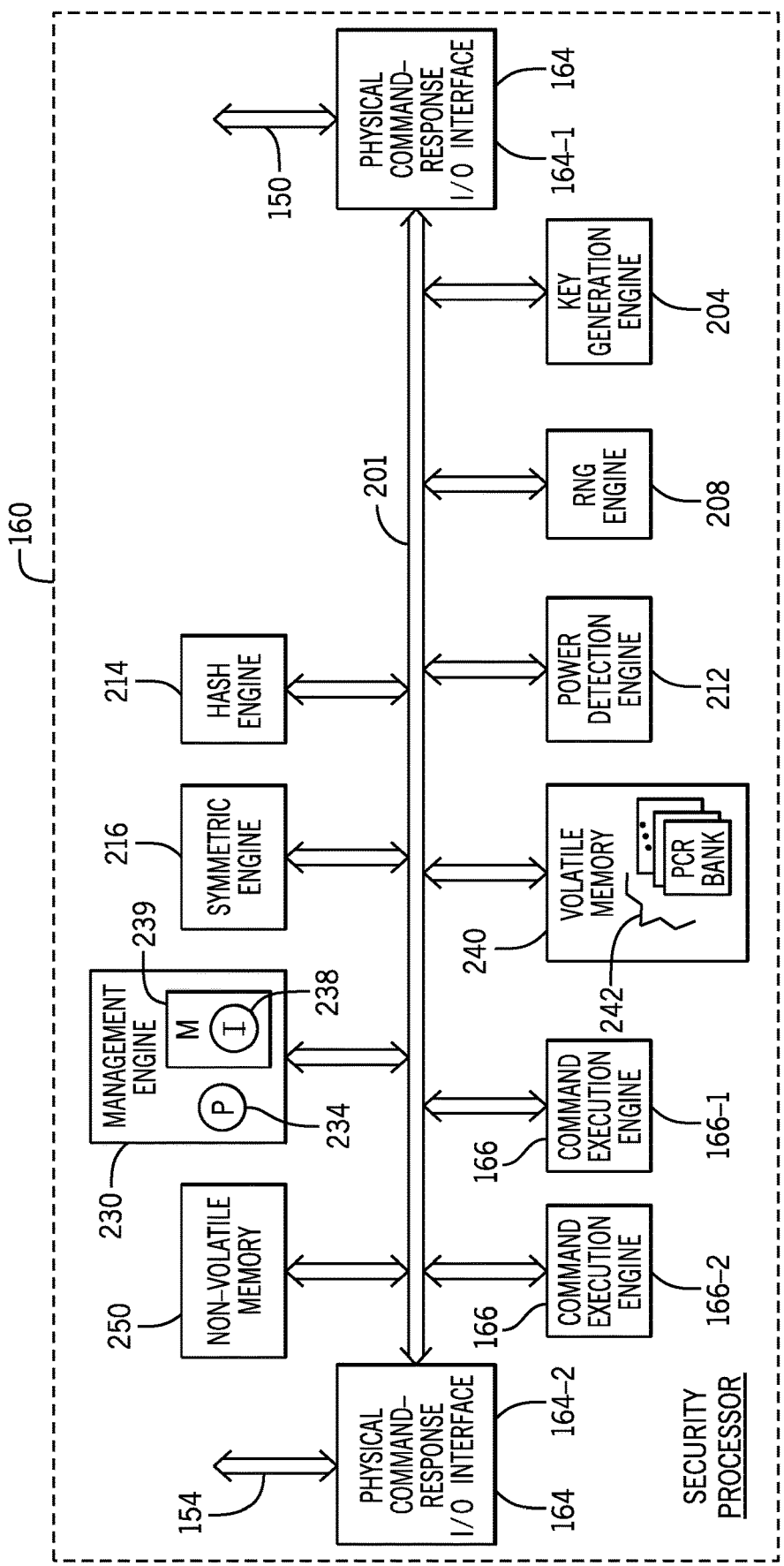
FIG. 2 is a schematic diagram of the security processor according to an example implementation.

In general, to execute a given command, the command execution engine 166 performs (directly and/or indirectly through the involvement of other components of the security processor 160, described further herein in connection with FIG. 2) one or multiple operations to perform the task(s) directed by the command and the command's operand(s) to provide a result. In accordance with some implementations, the security processor 160 may contain one or multiple command execution engines 166 per command-response I/O interface 164.

The "requests" that are submitted to the security processor 160 may, in accordance with example implementations, include commands and associated operands to cause the security processor 160 to perform corresponding trusted computing operations. Moreover, a given request for a given command-response I/O interface 164 may further include data representing that the requestor has possession of an ownership token.

As examples, the trusted computing operations may include generating cryptographic keys; distributing cryptographic keys; erasing cryptographic keys; storing security artifacts (e.g., cryptographic keys and certificates); encrypting data; decrypting data; accessing security artifacts; erasing security artifacts; store integrity measurement digests; providing signed integrity measurement digests for remote attestation; extending platform configuration registers (PCRs); sealing cryptographic keys to PCR states; unsealing cryptographic keys based on corresponding stored PCR states; providing nonces for cryptographic communications; signing certificates; providing random or pseudorandom numbers; as well as other operations. In accordance with some implementations, the security processor 160 may perform one or multiple trusted computing operations that are described in the Trusted Platform Module Library Specification, Family 2.0, Level 00, Revision 01.59 (November 2019), published by the Trusted Computing Group (hereinafter called the "TPM 2.0 Specification"). In accordance with some implementations, the security processor 160 may perform one or more trusted computing operations that are not described in the TPM 2.0 Specification. In accordance with example implementations, the "requests" that are submitted to the security processor 160 may include requests relating to establishing ownerships of respective command execution engines 166, including requests for establishing ownership tokens.

A tenant of the security processor 160, in general, may be an entity that is formed by one or multiple hardware processors (e.g., general purpose processing cores, embedded processing cores, and so forth) executing machine-executable instructions for purposes of using the services of the security processor 160 (e.g., connecting to command-response I/O interfaces 164 of the security processor 160 to submit commands and receive responses)

As a more specific example, in accordance with some implementations, the computer platform 100 may include one or multiple general purpose, main processing cores 110 (e.g., central processing unit (CPU) cores and graphics processing unit (GPU) cores) that may execute machine-executable instructions to form one or multiple tenants of the security processor 160. A given tenant that is associated with main processing core(s) 110 may exist in the pre-boot environment of the computer platform 100, in the post-boot environment of the computer platform 100, or in both the pre-boot and post-boot environments of the computer platform 100.

As an example, in the pre-boot environment of the computer platform 100, one or multiple main processing cores 110 may execute firmware (e.g., basic input/output system (BIOS) instructions or UEFI instructions) to form firmware boot services 134, which may be a tenant of the security processor 160. One or multiple processing cores 110 may execute firmware (e.g., UEFI instructions) in the post-boot environment to form such security processor tenants as a tenant that is associated with a Trusted Service Stack (TSS)

131 and a tenant that is associated with firmware runtime services 132. The TSS 131 may submit requests to the security processor 160 on behalf of applications and the operating system 130, and in accordance with some implementations, the TSS 131 may submit the commands to the security processor 160 one at a time. The TSS 131 may provide an application programming interface (API) that may be called by applications for purposes of accessing functions of the security processor 160. For the implementation depicted in FIG. 1, the TSS 131 is part of the operating system 130. However, in accordance with a further implementation, the TSS 131 may not be part of the operating system 130.

Tenants of the security processor 160 may be associated with processing entities other than the main processing cores 110. For example, a management controller of the computer platform 100, such as a BMC 123, may include one or multiple embedded processing cores 124 that execute machine-executable instructions 126 to form a tenant of the security processor 160 in both the pre-boot and post-boot environments of the computer platform 100.

As another example of a non-main processing core tenant, the computer platform 100 may include one or multiple smart I/O peripherals 101. The smart I/O peripheral 101 may include one or multiple processing cores 103 that execute machine-executable instructions 104 (stored in a memory 105) to form a tenant of the security processor 160 in the post-boot environment of the computer platform 100. Moreover, in accordance with some implementations, a dedicated smart I/O peripheral 101 may serve as a management controller of the computer platform 100 in place of the BMC 123, and for these implementations, the dedicated smart I/O peripheral 101 may be a tenant of the security processor 160 in both the pre-boot and post-boot environments of the computer platform 100.

The security processor 160 may have any of a number of command-response I/O interfaces 164, depending on the particular implementation. For the example implementation that is depicted in FIG. 1 and described further herein, the security processor 160 may have a command-response I/O interface 164-1 that is associated with the main processing cores 110 and a command-response I/O interface 164-2 that is associated with the BMC 123. The command-response I/O interface 164-1 may, for example, be a physical bus interface for a bus 150 of the computer platform 100, and the command-response I/O interface 164-2 may, for example, be a physical bus interface for another bus 154 of the computer platform 100. The buses 150 and 154 may be any of a number of different buses, such as an Inter-Integrated ($I^2C$), an Improved $I^2C$ bus (or "$I^3C$ bus"), a Serial Peripheral Interface (SPI) bus, an enhanced SPI (eSPI) bus, or another bus.

In accordance with example implementations, the physical command-response I/O interface 164-1 may be used by tenants that are formed by the main processing cores 110, such as the firmware boot services 134 (one tenant), the firmware runtime services 132 (another tenant) and the TSS 131 (another tenant). Depending on the particular implementation, the security processor 160 may have one or multiple command execution engines 166 to process, or execute, the commands that are received via the command-response I/O interface 164-1. For example, in accordance with some implementations, the security processor 160 may have a single command execution engine 166 to execute the commands that are received through the command-response I/O interface 164-1 from the firmware boot services 134, the firmware runtime services 132 and the TSS 131. For these example implementations, the tenants of the command-response I/O interface 164-1 may share an ownership token for the command execution engine 166.

In accordance with further example implementations, the security processor 160 may have two command execution engines 166 for the command-response I/O interface 164-1. A first command execution engine 166 executes the commands received from the firmware boot services 134 in the pre-boot environment and executes the commands received from the TSS 131 in the post-boot environment. A second command execution engine 166 executes the commands received from the firmware runtime services 132 in the post-boot environment. In accordance with further implementations, the security processor 160 may have a command execution engine 166 for each tenant of the physical command-response I/O interface 164-1.

The security processor 160 may, in accordance with example implementations, have a dedicated command execution engine 166 to execute commands that are received from the BMC 123 via the command-response I/O interface 164-2.

In accordance with some implementations, the security processor 160 may have multiple command-response I/O interfaces 164 that are coupled to the same bus of the computer platform 100. For example, in accordance with some implementations, the security processor 160 may include a first command-response I/O interface 164 that is coupled to the bus 150 to receive commands from the firmware runtime services 132 and the firmware boot services 134. The security processor 160 may further include a second command-response I/O interface 164 that is coupled to the bus 150 to receive commands from the TSS 131. The security processor 160 may further include one or multiple additional command-response I/O interfaces 164 that are coupled to the bus 150 to receive commands from one or multiple smart I/O peripherals 101.

In accordance with some implementations, a given physical bus interface may be associated with multiple command-response I/O interfaces 164. For example, in accordance with some implementations, for a particular physical bus interface, different logical overlays may be associated with the bus interface to create multiple physical command-response I/O interfaces 164 (i.e., each command-response I/O interface 164 is formed from the bus interface and a different logical overlay).

In accordance with further example implementations, the security processor 160 may have a command-response I/O interface 164 for each tenant of the security processor 160.

The computer platform 100, in accordance with example implementations, may be a modular unit, which includes a frame, or chassis. Moreover, this modular unit may include hardware that is mounted to the chassis and is capable of executing machine-executable instructions. A blade server is an example of the computer platform 100, in accordance with an example implementation. The computer platform 100 may, however, be any of number of different platforms other than a blade server, in accordance with further implementations, such as a rack-mounted server, a client, a desktop, a smartphone, a laptop computer, a tablet computer, a modular switch, storage array, a cluster node, and so forth.

A "smart I/O peripheral" (e.g., a smart network interface controller, or "smart NIC") refers to a peripheral that offloads processing operations that were traditionally performed by main processing cores of legacy computer systems. For example, a given smart I/O peripheral 101 of the computer platform 100 may provide backend I/O services for the platform 100. As examples, the I/O services may include network virtualization services (e.g., overlay network services, virtual switching services, virtual routing services and network function virtualization services); network storage services; networking monitoring services; storage acceleration services (e.g., non-volatile memory express (NVMe)-based services); security services (e.g., cryptography services and network firewall services); and so forth.

As part of performing the backend I/O services, the smart I/O peripherals 101 may submit requests to the security processor 160. In accordance with example implementations, the smart I/O peripherals 101 may provide backend I/O services as part of a cloud centric (or "cloud native) architecture. In this manner, in accordance with example implementations, the computer platform 100 may be one of multiple computing resources 191 that are part of a cloud computing system 99. For these example implementations, one or multiple smart I/O peripherals 101 of the computer platform 100 may be smart Network Interface Controllers (NICs).

As depicted in FIG. 1, the smart I/O peripherals 101 may be coupled to the computing resources 191 and cloud tenant computer systems, or clients 193, via network fabric 190. In general, the network fabric 190 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

The main processing cores 110 may execute various instances of applications that are associated with different cloud tenants (e.g., application instances executing in virtual machines, within certain containers, and so forth) associated with cloud tenant-associated clients 193 of the cloud computer system 99. The execution of the cloud tenant applications may consume backend I/O services that are provided by the smart I/O peripherals 101. In accordance with example implementations, the processing core(s) 103 of the smart I/O peripheral 101 may execute instructions 104 for purposes of providing one or more backend I/O services. As part of a smart I/O peripheral 101 providing backend I/O service(s), the smart I/O peripheral 101 may be a tenant of the security processor 160 and as such, may submit requests to the security processor 160.

In accordance with example implementations, the BMC 123 may be an embedded system that is mounted to a motherboard of the computer platform 100. In accordance with further implementations, the BMC 123 may be an expansion card that is connected to a motherboard connector slot of the computer platform 100. Depending on the particular implementation, the BMC 123 may contain one or multiple semiconductor packages (or "chips") and one or multiple semiconductor die. The BMC 123 may not contain semiconductor package(s) mounted to the motherboard or may not be an expansion card, in accordance with further implementations.

The BMC 123, as part of its management plane, may perform various management roles for the computer platform 100, including monitoring sensors (e.g., temperature sensors, cooling fan speed sensors); monitoring operating system status; monitoring power statuses; logging computer system events; and providing management functions, which may be controlled remotely by a remote management server 194. Moreover, the BMC 123 may allow operations to be performed when the computer platform 100 is powered down and before the operating system has booted; and the BMC 123 may be used to perform recovery operations after an operating system or computer system failure. In accordance with example implementations, the BMC 123 may include a network interface to communicate with the remote management server 194 via the network fabric 190. In accordance with further implementations, the BMC 123 may communicate with the remote management server 194 via passthrough communications through a smart I/O peripheral 101.

The BMC 123 may, as part of its security plane, perform various security-related roles for the computer platform 100, such as validating BMC firmware before the firmware is executed by the BMC 123. The security-related roles may also include validating UEFI firmware and BIOS firmware, after a power on or reset of the computer platform 100, before the firmware is executed by the main processing core(s) 110. The security-related roles may include monitoring software measurements (operating system kernel measurements) to detect security issues. the security-related roles may include updating firmware. Moreover, as part of its security-related roles, the BMC 123 may measure an UEFI boot block and extending a PCR state stored in the security processor 160 with the measured UEFI boot state. The BMC 123 may perform any of a number of other security-related roles, such as securing out-of-band key/secret distribution; verifying hardware of the computer platform 100 via the platform certificate; and so forth. For these security-related roles, the BMC 123 may be a tenant of the security processor 160 and as such, may submit requests corresponding to the security-related roles to the security processor 160 via the command-response I/O interface 164-2. Moreover, the BMC 123 may submit the requests to the security processor 160 both in the pre-boot environment of the computer platform 100 and in the post-boot environment of the computer platform 100.

As a specific example of BMC-submitted requests to the security processor 160, in accordance with some implementations, the BMC 123 may, in the pre-boot environment of the computer platform 100, perform an initial integrity measurement for the computer platform 100, such as measuring a UEFI boot block. The BMC 123 may, for example, submit a request to the security processor 160, via the command-response I/O interface 164-2, for the security processor 160 to calculate a hash of the UEFI boot block. Moreover, the BMC 123 may, for example, submit a request, via the command-response I/O interface 164-2, for the security processor 160 to extend PCR number zero (or "PCR0") of the security processor 160 based on the calculated hash. The BMC 123 may, in the post-boot environment of the computer platform 100, submit requests, via the command-response I/O interface 164-2, for the security processor 160 for such purposes as performing integrity measurements of the operating system 130 and correspondingly extending a PCR state; performing integrity measurements of applications and correspondingly extending a PCR state; verifying hardware of the computer platform 100 using a platform certificate; securing out-of-band key/secret distribution; and so forth.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

For purposes of providing requests to the security processor 160, the BMC 123 contains one or multiple embedded processing cores 124. In accordance with example implementations, the embedded processor cores 124 may execute machine-executable instructions 126 that are stored in a memory 128 of the BMC 123 for purposes of performing the BMC's management and security-related roles, which include the BMC 123 submitting requests to the security processor 160.

In accordance with example implementations, the command-response I/O interface 164 is an actual interface that includes actual hardware and may include machine-executable instructions. In accordance with example implementations, the command-response I/O interface 164 may include one or multiple processing cores that execute machine-executable instructions to perform one or multiple functions described herein, such as receiving requests, communicating commands to a command execution engine of the security processor 160, processing entity authentication, allowing ownership, accepting requests from the owner, rejecting requests from non-owners, communicating responses to requests, and so forth. In accordance with further implementations, one or multiple functions of the command-response I/O interface 164 may be performed by hardware logic, i.e., non-processing core circuitry, such as a complex programmable logic device (CPLD), an application specific integrated circuit (ASIC), a field programmable gate array (FPGA), and so forth.

A given command-response I/O interface 164 may, at a given time, be "owned." In this context, a command-response I/O interface 164 "being owned" by a given tenant refers to the interface 164 being connected to the tenant. In accordance with example implementations, a given command execution engine 166 is "owned" based on a corresponding ownership token. In accordance with example implementations, the command execution engine 166 executes commands associated with its ownership token (i.e., executes commands for a tenant that provides the ownership token) and does not execute commands that are not associated with its ownership token.

As an example, a tenant of the security processor 160 may establish ownership of a command execution engine 166 that is associated with a particular command-response I/O interface 164 as follows. First, the tenant may request an endorsement credential from the security processor 160. As an example, the endorsement credential may be a certificate that is signed by a certificate authority (CA). Moreover, the certificate may contain a public key of a public key, private key pair, such that the security processor 160 has the private key (e.g., an endorsement key). The tenant may generate an ownership token, and after the tenant authenticates the endorsement credential that is provided by the security processor 160, the tenant may sign the ownership token with the public key to encrypt the ownership token. The entity may then send the encrypted ownership token to the command execution engine 166. Other techniques may be used to establish ownership of a command execution engine 166 and set up an ownership token, in accordance with further implementations.

In accordance with example implementations, the security processor 160 may be a Root of Trust for storing and a Root of Trust for reporting for the computer platform 100. In this context, a "Root of Trust device" or "RoT device," may be a device that behaves in an expected manner, as the RoT device's misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values.

In accordance with example implementations, the security processor 160, as part of the Root of Trust for storing, has a memory, such as a PCR memory, which stores data that represents hash values, which represent integrity measurements (e.g., integrity measurement digests) of the computer platform's trusted computing base. In accordance with example implementations, the PCR memory may be extended for a new integrity measurement through the use of a "PCR extend" command. Execution of the PCR extend command causes a hash to be calculated based on the current content of the PCR and new integrity measurement(s), and this calculated hash is then stored in the PCR memory in place of the current content. Stated differently, the PCR extend command, in accordance with example implementations, updates an integrity measurement digest that is stored in PCR memory of the security processor 160.

The security processor 160, in accordance with example implementations, may be in the form of a semiconductor package (or "chip") that is mounted to a motherboard of the computer platform 100. In addition to the PCR memory, the security processor 160 may include a memory to securely store security artifacts, such as cryptographic keys, passwords, sealed cryptographic keys, passwords, certificates, public keys, private keys, and so forth. The security processor 160 includes other cryptographic processing-related components that are depicted in FIG. 2 and described below. The security processor 160 may be designed according to industry standards to provide hardware-based, security functions while also resisting tampering and malicious software. In accordance with some implementations, the security processor 160 may be a TPM.

Among its other features, in accordance with example implementations, the computer platform 100 may include a system memory 114, a bus infrastructure, storage devices, I/O devices, and so forth. In accordance with example implementations, the system memory 114 and other memories and storage media that are discussed herein are non-transitory storage media that may be formed from semiconductor storage devices, memristor-based storage devices, magnetic storage devices, phase change memory devices, a combination of devices of one or more of these storage technologies, and so forth. The system memory 114 may represent a collection of both volatile memory devices and non-volatile memory devices.

In accordance with example implementations, the bus infrastructure of the computer platform 100 may include one or multiple bridges 118 that may be connected to the system memory 114, the smart I/O peripherals 101, the BMC 123 and the security processor 160 for purposes of establishing communications among these components. In accordance with some implementations, the main processing core 110 may include one or multiple semiconductor packages (or "chips"), and the main processing core 110 may include a north bridge 118 that includes a memory controller (for system memory 114 accesses) and PCIe root ports. The computer platform 100 may also include a south bridge 118 that provides I/O ports, such as Serial Advanced Technology Attachment (SATA) ports, Universal Serial Bus (USB) ports, Low Pin Count (LPC) ports, SPI ports, eSPI ports and so forth. In accordance with some implementations, the north bridge 118 may be part of the main processing core 110. In accordance with further implementations, the north and south bridges may be combined into a single bridge 118; and in accordance with some implementations, this single bridge 118 may be part of the main processing core 110.

FIG. 2 depicts an architecture of the security processor 160, in accordance with an example implementation. Referring to FIG. 2, in conjunction with FIG. 1, in accordance with some implementations, the command-response I/O interfaces 164-1 and 164-2 decode signals from and encode signals onto the associated buses 150 and 154, respectively, for purposes of receiving requests and providing corresponding responses. Each command-response I/O interface 164 may include one or multiple buffers (e.g., first-in-first-out (FIFO) buffers) for purposes of temporarily storing data that is communicated to and from the associated bus. For a given command-response I/O interface 164, incoming data from the bus may represent tenant requests and as such, may represent commands to be processed by one or multiple command execution engines of the security processor 160. Moreover, for a given command-response I/O interface 164, outgoing data may represent responses to the tenant requests. The command-response I/O interfaces 164 may communicate with other components of the security processor 160 through a bus infrastructure 201, which may include one or multiple buses, one or multiple bridges, and so forth.

For the example implementation that is depicted in FIG. 2, the security processor 160 includes two command execution engines 166-1 and 166-2. As an example, the command execution engine 166-1 may process, or execute, commands that are received by the command-response I/O interface 164-1, and the command execution engine 166-2 may process, or execute, commands that are received by command-response I/O interface 164-2. Although FIG. 2 depicts one command execution engine 166 per command-response I/O interface 164, in accordance with further implementations, a given command-response I/O interface 164 may be associated with multiple dedicated command execution engines 166 to execute the commands that are received by the interface 164. Depending on the particular implementation, the command execution engine 166 may be formed from one or multiple processing cores executing instructions, hardware logic or a combination of processing cores and hardware logic.

In accordance with some implementations, the security processor 160 may have a group, or pool, of available command execution engines 166; and the security processor 160 may be configured with assignments between the command execution engines 166 and the command-response I/O interfaces 164. More specifically, in accordance with example implementations, the command-response I/O interface 164-1 may be considered to be a primary interface of the security processor 160, and the first owner (i.e., the first tenant that sets up an ownership token via the interface 164-1, such as the UEFI) may configure one or multiple features of the security processor 160, i.e., the first owner may set up or establish one or more configuration policies for the security processor 160.

For example, in accordance with some implementations, the first owner may specify the specific enablement or disablement of each of the other command-response I/O interfaces 164 (i.e., enable or disable the interfaces 164 other than interface 164-1). As a more specific example, in accordance with some implementations, the UEFI may, via the command-response I/O interface 164-1, set up the initial ownership token, and after setting up the initial ownership token, the UEFI may enable or disable the command-response I/O interface 164-2. In accordance with further example implementations, the security processor 160 may contain more than two command-response I/O interfaces 164, and the initial owner may selectively disable and enable other command-response I/O interfaces 164. In accordance with example implementations, the initial owner may assign a number of command execution engines 166 to a particular command-response I/O interface 164. Regardless of the configuration policy or polices that are set in place by the initial owner, in accordance with some implementations, the initial owner may lock the configuration so that the configuration cannot be changed thereafter (e.g., cannot be changed until the next power up).

In accordance with some implementations, the setting and locking of the configuration policies may involve the initial owner accessing a configuration space of the security processor 160, such as, for example, a region of a volatile memory 240 or other memory region of the security processor 160. In accordance with example implementations, a management engine 230 (or "management processor") of the security processor 160 may respond to the configuration data stored by the initial owner in the configuration space to perform actions that are indicated by the configuration data. These actions may include enabling certain command-response I/O interface(s) 164, disabling certain command-response I/O interface(s) 164, assigning command execution engine(s) 166 to command-response I/O interface(s) 164, and so forth. After the initial owner writes configuration data to the configuration space, in accordance with example implementations, the management engine 230 may set a lock bit to prevent further modification of the configuration policies until the next power up of the security processor 160.

The management engine 230 may perform a variety of other functions for the security processor 160, such as controlling whether a command-response I/O interface 164 accepts or rejects a given request; verifying an ownership token provided by a requestor for purposes of determining whether the provided ownership token matches an ownership token set up for the corresponding command execution engine 166; coordinating components (described below) of the security processor 160 to provide functions to process a given command being executed by a command execution engine 166; controlling access to a protected object (as described below in connection with FIG. 5); controlling PCR bank sharing (as described below in connection with FIG. 4A); controlling PCR bank reservations (as described below in connection with FIG. 4B); and so forth.

In accordance with example implementations, the management engine 230 may enforce the respective ownerships of the command execution engines 166. In this context, "enforcing" an ownership for a command execution engine 166 refers to the management engine 230 allowing a command execution engine 166 to process commands corresponding to the ownership token for the command execution engine 166 and preventing the command execution engine 166 from executing commands that are not associated with the ownership token.

In accordance with some implementations, the management engine 230 may include one or multiple processing cores 234 that execute machine-executable instructions 238 that are stored in a memory 239 for purposes of performing one or multiple of these functions. In accordance with further implementations, the management engine 230 may be formed in whole or in part by hardware logic, i.e., non-processing core circuitry, such as a CPLD, an ASIC, an FPGA, and so forth.

As depicted in FIG. 2, in accordance with some implementations, the security processor 160 may include components to perform different trusted computing-related operations. For example, these components may include a hash engine 214 to determine hashes; one or multiple symmetric engines 216 to perform symmetric encryption and decryption; a key generation engine 204 to generate cryptographic keys; and a random number generator engine 208 to generate random or pseudorandom numbers. The security processor 160 may further include a power detection engine 212 to detect power state transitions of the computer platform 100. As depicted in FIG. 2, in accordance with some implementations, the security processor 160 may include a non-volatile memory 250, which stores security artifacts for the security processor 160, such as, for example, a platform seed, an endorsement seed, a storage seed, cryptographic keys, and so forth. Moreover, the security processor 160 may include a volatile memory 240 may, for example, store integrity measurement data corresponding to PCR banks 242, data representing keys in use, and so forth. Any of these engines of the security processor 160 may, in accordance with example implementations, be formed from a processor core that executes machine executable instructions, or may be formed in whole or in part by hardware logic, i.e., non-processing core circuitry, such as a CPLD, an ASIC, an FPGA, and so forth.

Figure 3:
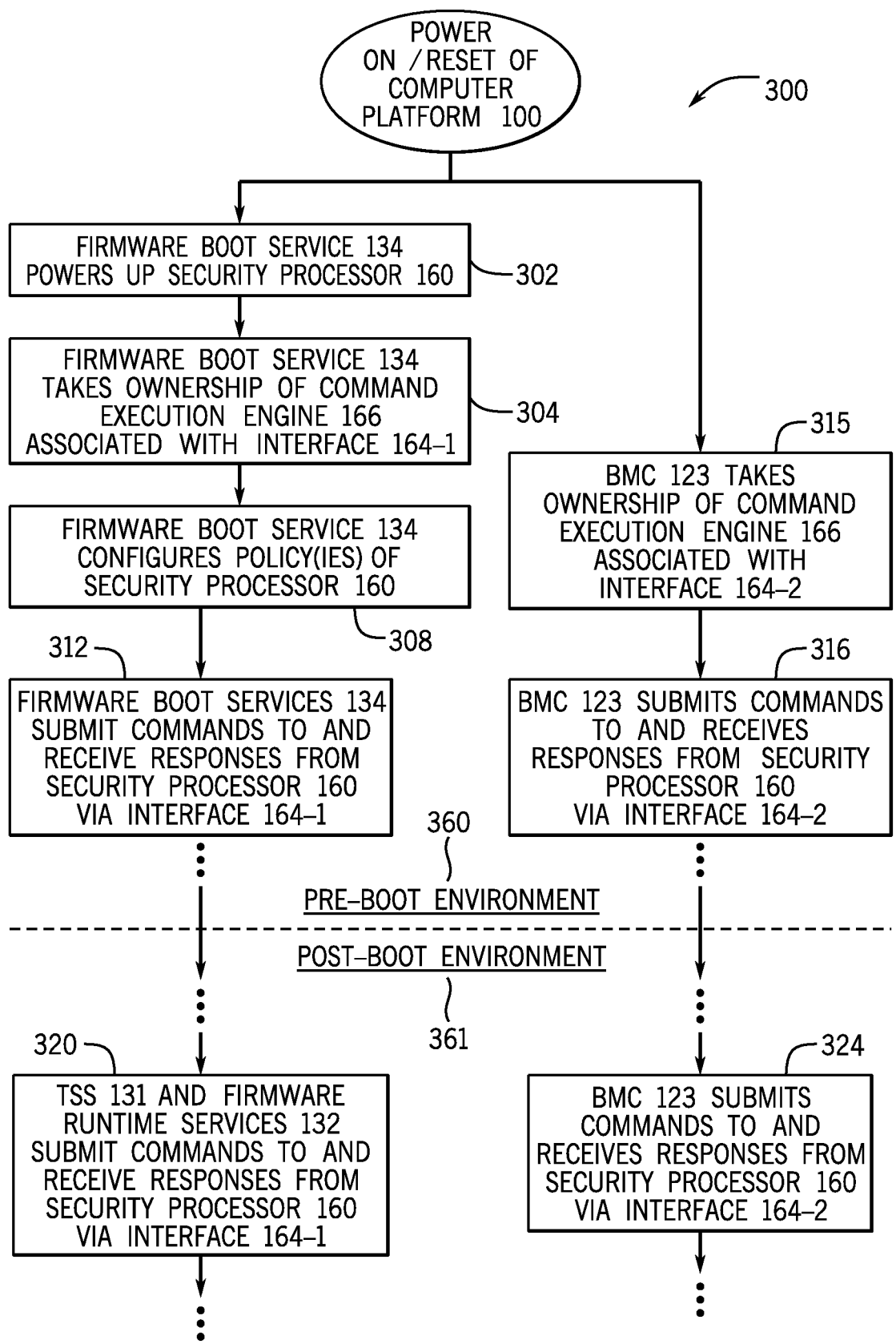
FIG. 3 is a flow diagram depicting configuration of the security processor and the processing of commands by the security processor according to an example implementation.

Referring to FIG. 3, in conjunction with FIG. 1, in accordance with some implementations, the computer platform 100 may perform a process 300 for purposes of configuring and using the security processor 160. FIG. 3 depicts two example request paths corresponding to tenants of the command-response I/O interface 164-1 (one path) and the BMC 123 (the other path). More specifically, one request path is associated with the command-response I/O interface 164-1 and includes blocks 302, 304, 308, 312 and 320. The other request path is associated with the command-response I/O interface 164-2 and includes blocks 315, 316 and 324.

The process 300 begins in a pre-boot environment 360 of the computer platform 100 responsive to a power on or reset of the computer platform 100. As depicted in FIG. 3, a firmware boot service 134 (e.g., a UEFI firmware service) takes ownership (block 304) of a command execution engine 166 that is associated with the command-response I/O interface 164-1, and as part of taking ownership, the firmware boot service 134 establishes an ownership token. In accordance with example implementations, the firmware boot services 134 may share the ownership token with one or multiple other tenants of the computer platform 100, such as, for example, the TSS 131 (e.g., the firmware boot services 134 may share the ownership token as an UEFI variable).

Due to the firmware boot service 134 being the initial owner, the firmware boot service 134 may, in accordance with example implementations, set up one or multiple configuration policies of the security processor 160, as depicted at block 308. In this manner, in accordance with some implementations, the firmware boot service 134 may enable or disable the command-response I/O interface 164-2, as well as possibly enable or disable one or multiple other command-response I/O interfaces 164 of the security processor 160. Upon setting up the configuration policy(ies) of the security processor 160, the firmware boot service 134 may then set a lock on policy(ies).

In block 312, the firmware boot services 134 submit commands and receive responses from the security processor 160 via the command-response I/O interface 164-1 in the pre-boot environment 360 of the computer platform 100. Also, in the pre-boot environment 360, the BMC 123 may, pursuant to block 315, take ownership of a command execution engine 166 that is associated with the command-response I/O interface 164-2, including setting up an ownership token. The BMC 123 may thereafter submit commands to and receive responses from the security processor 160 via the command-response I/O interface 164-2, as depicted in block 316.

In a post-boot environment 361 of the computer platform, in accordance with example implementations, the TSS 131 and the firmware runtime services 132 may share the ownership token for the command-response I/O interface 164-1, as depicted in block 320. It is noted that in accordance with further example implementations, the TSS 131 may use a different command-response I/O interface 164 than the command-response I/O interface 164 used by the firmware runtime services 132. As depicted in block 324, also in the post-boot environment 361 of the computer platform, the BMC 123 may submit commands to and receive responses from the security processor 160 via the command-response I/O interface 164-2.

Figure 4A:
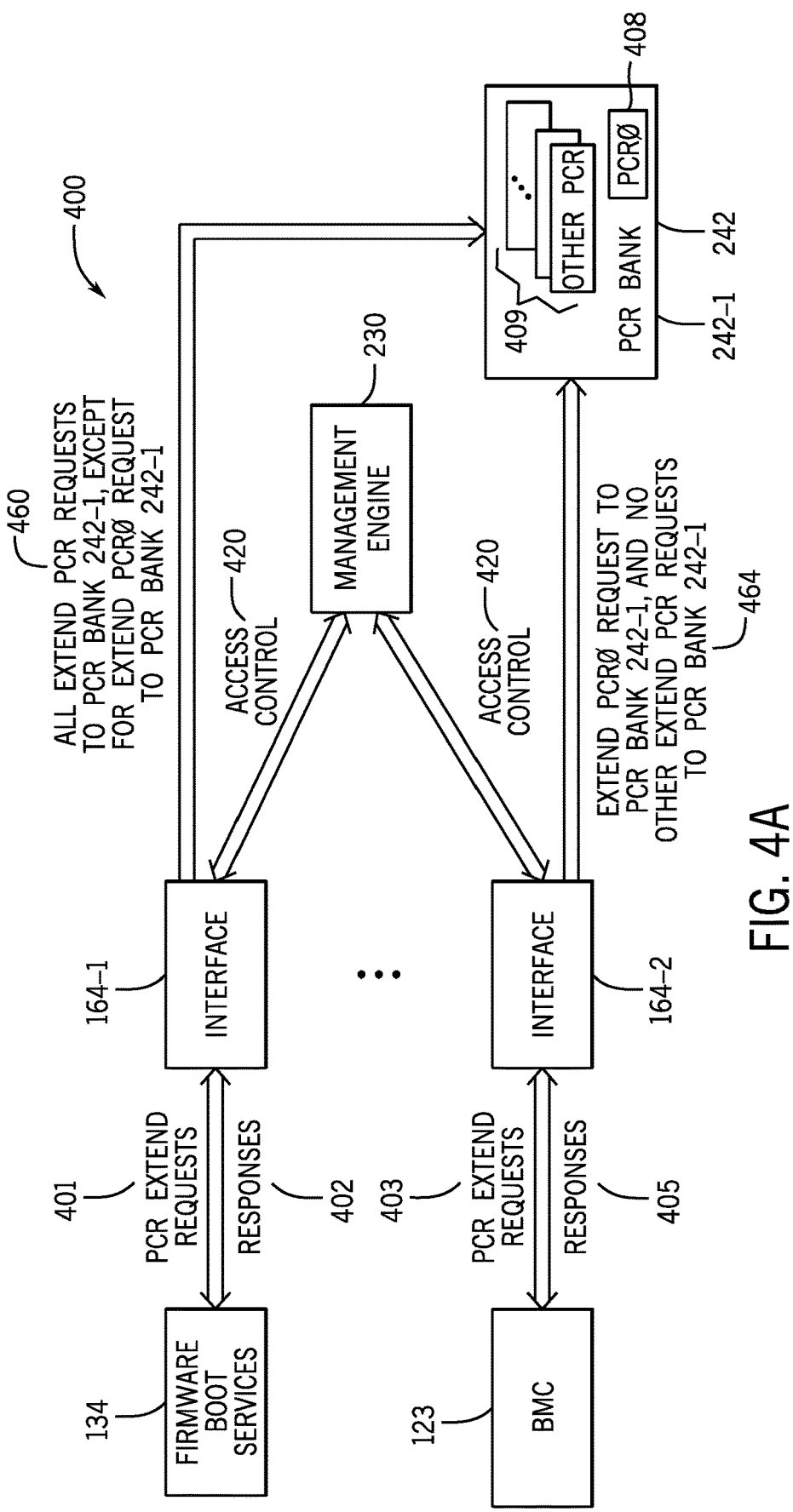
FIG. 4A is an illustration of tenant sharing of platform configuration registers (PCRs) of the security processor according to an example implementation.

In accordance with some implementations, a particular resource of the security processor 160, such as, for example, one or multiple PCRs, may be shared among tenants, and this sharing may, in accordance with example implementations, be controlled at the command level. For example, FIG. 4A depicts an illustration 400 of PCR sharing among the BMC 123 and the firmware boot services 134, in accordance with example implementations. Referring to FIG. 4A, in conjunction with FIGS. 1 and 2, in accordance with some implementations, the firmware boot services 134 and the BMC 123 may have, to some extent, shared access to a PCR bank 242-1. FIG. 4A depicts extend PCR requests 401 submitted by the firmware boot services 134 to the command-response I/O interface 164-1, which result in corresponding responses 402. FIG. 4A also depicts extend PCR requests 403 submitted by the BMC 123 to the command-response I/O interface 164-2, which result in corresponding responses 405.

More specifically, the BMC 123 may through the command-response I/O interface 164-2, submit a PCR extend command to record a measurement of the UEFI boot block into PCR register number zero (hereinafter called "PCR0 408"). This allows the BMC 123 to independently attest to both the UEFI and the BMC firmware and software stacks.

As such, the BMC 123 may be allowed to extend PCR0 408 with an initial UEFI boot block measurement.

As depicted in FIG. 4A, the firmware boot services 134 may have permission to extend PCRs 409 of the PCR bank 242-1 other than PCR0 408. Moreover, in accordance with some implementations, both the firmware boot services 134 and the BMC 123 may have read access rights to all of the PCRs of the PCR bank 242-1; and the BMC 123 may not be permitted to extend the other PCRs 409. As depicted in FIG. 4A by reference numeral 420, in accordance with some implementations, the management engine 230 may regulate access permissions to the PCR bank 242 to regulate sharing and access restrictions by monitoring, at the command level, the commands and operands, which are received via the command-response I/O interfaces 164-1 and 164-2.

Although PCRs are described above for purposes of illustrating a shared resource, in accordance with other implementations, the shared resource may be a resource other than an integrity measurement register. For example, in accordance with some implementations, the shared resource may be a designated region or regions of the volatile memory 240 (FIG. 2).

Figure 4B:
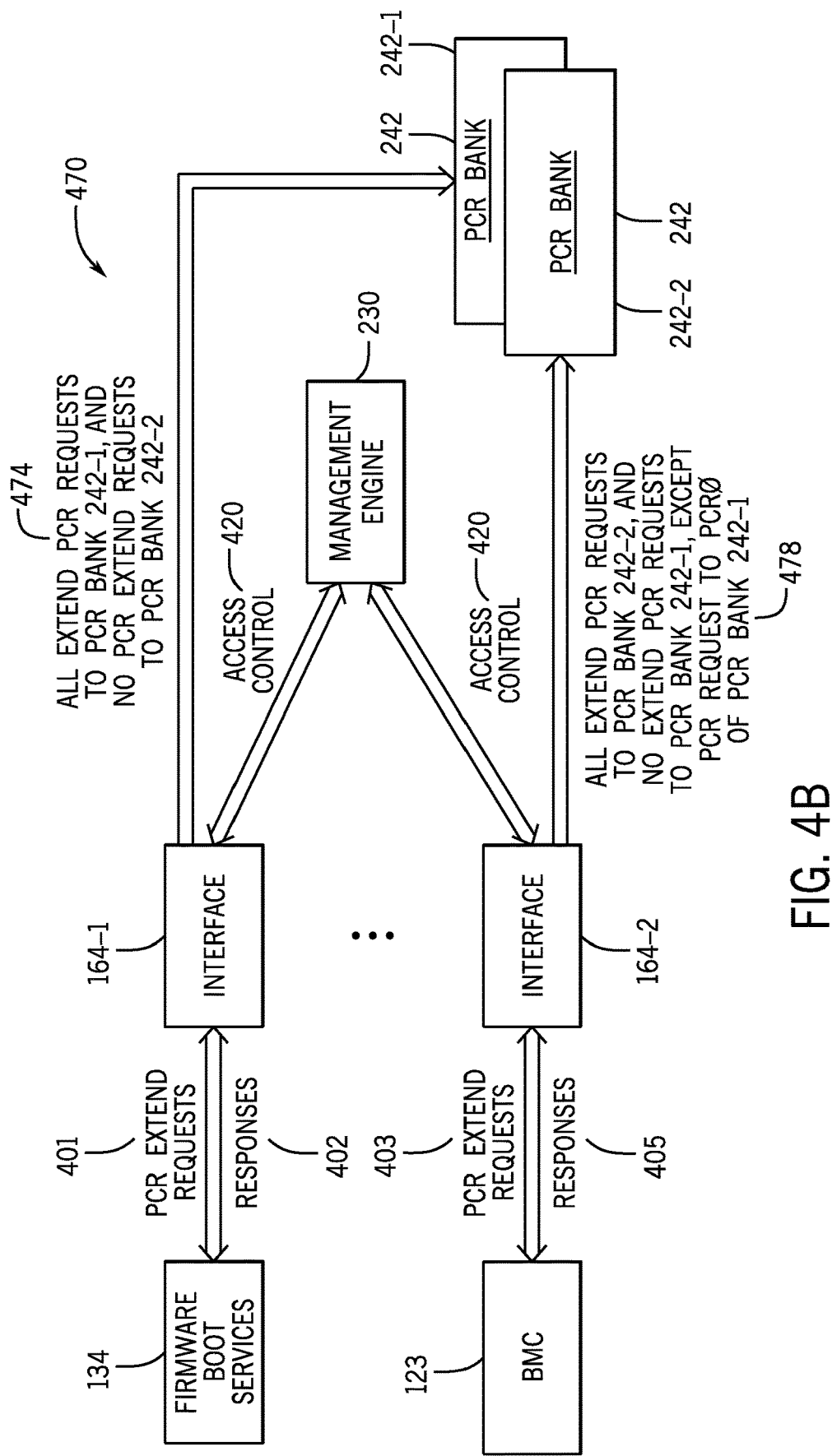
FIG. 4B is an illustration of PCR reservation among tenants of the security processor according to an example implementation.

FIG. 4B depicts a PCR bank reservation 470 that is managed by the security processor 160, in accordance with example implementations. More specifically, referring to FIG. 4B in conjunction with FIGS. 1 and 2, in accordance with some implementations, the security processor 160 reserves one PCR bank 241-1 for the firmware boot service 134 and reserves another PCR bank 242-2 for the BMC 123. The management engine 230 performs command-level access control 420 on the corresponding command-response I/O interfaces 164-1 and 164-2 accordingly. The firmware boot service 134, as depicted at reference number 474, may record its boot measurements in the associated PCR bank 242-1 (via extend PCR requests); and the BMC 123 may record its boot measurements in the associated PCR bank 242-2 (via PCR extend requests). This allows independent attestation of both the firmware boot service 134 and the BMC 123 firmware and software stack. It is noted that with this PCR bank reservation, in accordance with some implementations, the BMC 123 may still be allowed to access the PCR bank 242-1 to record an initial boot block measurement (e.g., record an initial UEFI boot block measurement using an extend PCR command directed to PCR0).

Figure 5:
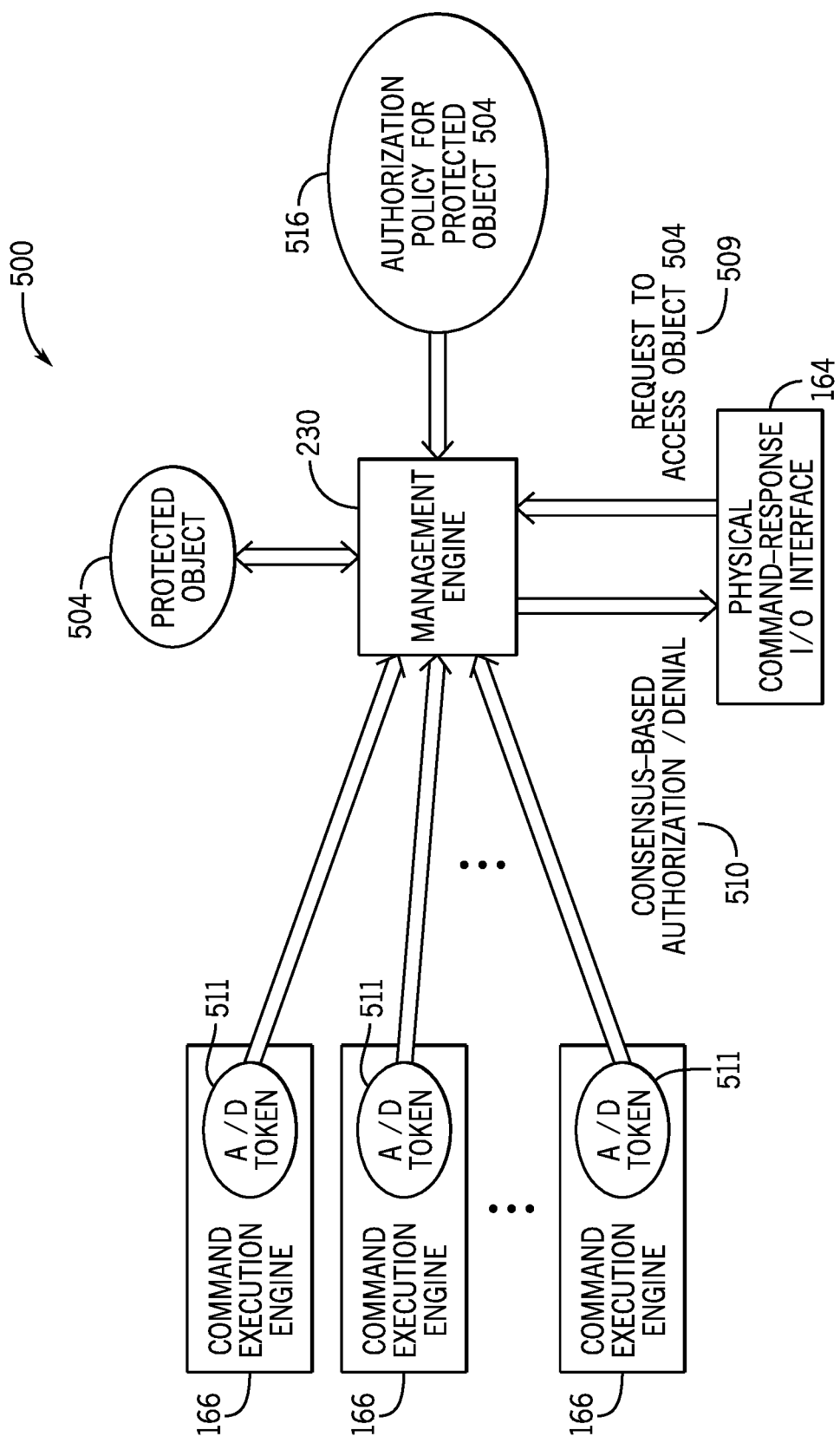
FIG. 5 is an illustration of tenant consensus-based access control for a protected object stored by the security processor according to an example implementation.

FIG. 5 depicts an illustration 500 of the security processor 160 regulating access to a protected object 504 (e.g., a cryptographic key, a seed, certificate, or a secret) that is stored in the security processor 160, in accordance with example implementations. Referring to FIG. 5 in conjunction with FIGS. 1 and 2, for this example, a given requestor submits a request 509 via its associated command-response I/O interface 164 to access (e.g., read, modify or delete) the protected object 504. In accordance with example implementations, the management engine 230 may employ a consensus-based approval model for regulating access to the protected object 504. As a result of applying the consensus-based approval model, the management engine 230, in accordance with example implementations, provides (as depicted at reference numeral 510) an authorization to the interface 164 to allow the request 509 to proceed or provides a denial of the request 509 to the interface 164.

In accordance with example implementations, the consensus-based approval model may correspond to an authorization policy 516 for the protected object 504. As an example, in accordance with some implementations, the authorization policy 516 may be set, or configured, by the tenant that creates the protected object 504. In accordance with a further implementation, the authorization policy 516 may be created by the initial owner of the security processor 160. In general, the authorization policy 516, in accordance with example implementations, defines a "consensus" and/or controls how the consensus controls access to the protected object 504.

In accordance with example implementations, the command execution engines 166 may each contain an authorization/denial token 511 (called a "token 511" herein), which may be set, or configured, by the respective owners of the command execution engines 166. The token 511 amounts to a "vote" (i.e., an authorization or a denial) to control whether or not the request 509 is authorized or denied. Moreover, in accordance with example implementations, the vote represented by the token 511 may depend on the type of access that is requested by the request 509. For example, a given token 511 may represent, for a requested read of the protected object 504, and the token 511 may represent denial for a requested modification of the protected object 504. In accordance with some implementations, the token 511 may further represent different sets of access permission-related votes for different types of protected objects 504 and/or different security classifications for the objects 504. In accordance with some implementations, a given command execution engine 166 may store multiple tokens 511, where each token 511 may represent access permission-related vote for a particular category (e.g., the command execution engine 166 may contain one token 511 that represents access permission-related votes for keys and another token 511 that represents access permission-related votes for certificates).

The management engine 230 may, in accordance with example implementations, grant or deny the request 509 based on a consensus of the tokens 511 and the authorization policy 516 for the protected object 504. In accordance with some implementations, the management engine 230 grants or denies the request 509 based on a consensus of the tokens 511, as controlled by the authorization policy 516. The authorization policy 516 may be any of a number of different policies to determine whether or not a consensus has been reached. As an example, reaching a consensus may refer to a simple majority of the command execution engines 166 (via their respective tokens 511) allowing or denying the request 509. Reaching a consensus, as another example, may refer to access to the protected object 504 being allowed if a predetermined number of the command execution engines 166 (via the respective tokens 511) authorize the request 509, but the request 509 is otherwise denied. As another example, reaching a consensus may refer to the request 509 being allowed if the token-based authorizations are unanimous, but the request 509 is otherwise denied. In accordance with some implementations, the authorization policy 516 may set forth different definitions of consensus, depending on the type of access that is being requested.

Figure 6:
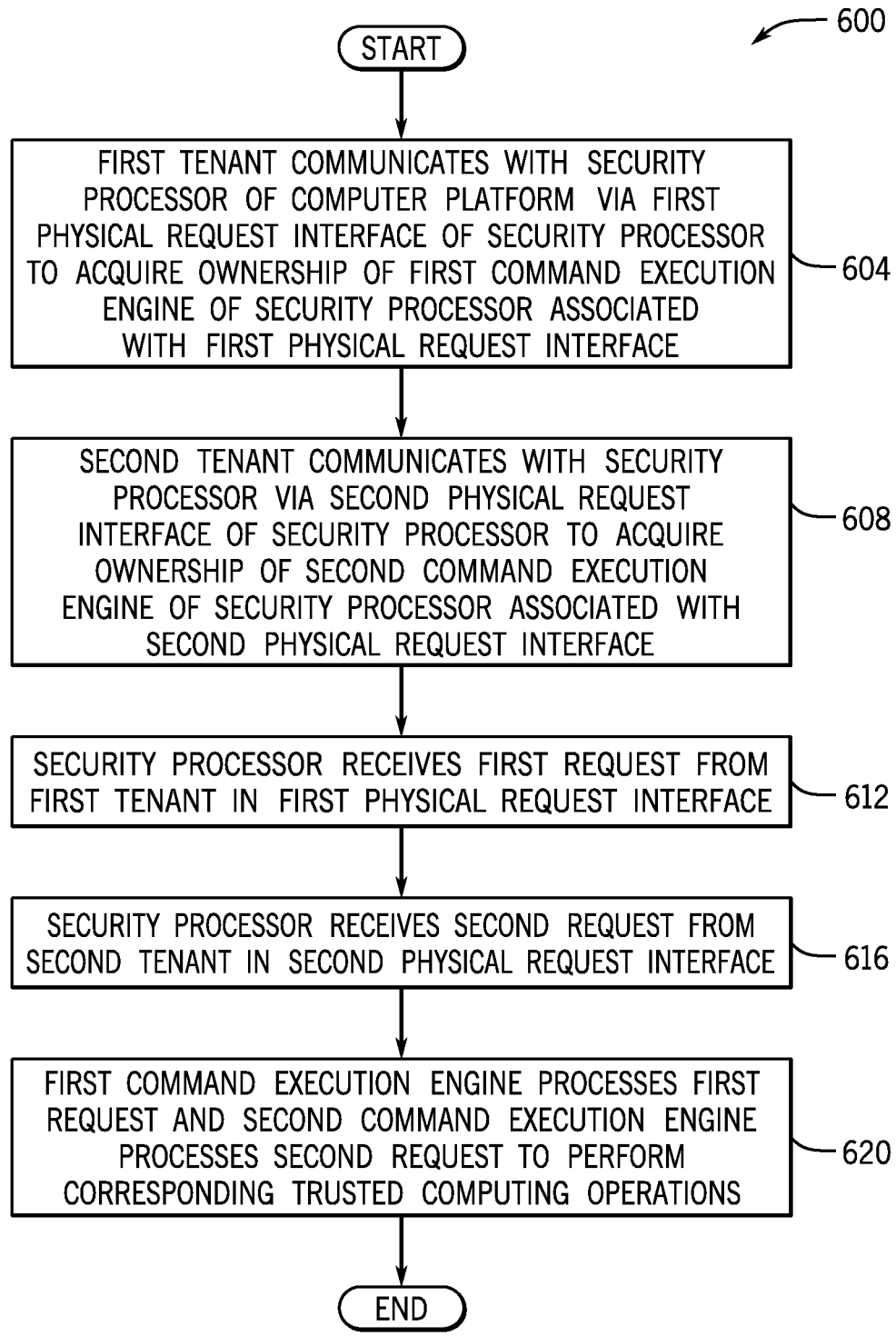
FIG. 6 is a flow diagram depicting a process of a security processor to perform trusted computing operations according to an example implementation.

Referring to FIG. 6, in accordance with example implementations, a process 600 includes a first tenant of a plurality of tenants communicating (block 604) with a security processor of a computer platform, via a first physical request interface of the security processor, to acquire ownership of a first command execution engine of the security processor associated with the first physical request interface. The process 600 includes a second tenant of the plurality of tenants communicating (block 608) with the security processor, via a second physical request interface of the security processor, to acquire ownership of a second command execution engine of the security processor associated with the second physical request interface. The process 600 includes the security processor receiving (block 612) a first request from the first tenant in the first physical interface, and the second processor receiving (block 616) a second request from the second tenant in the second physical request interface. The process 600 includes, pursuant to block 620, the first command execution engine processing the first request and the second command execution engine processing the second request to perform corresponding trusted computing operations.

Figure 7:
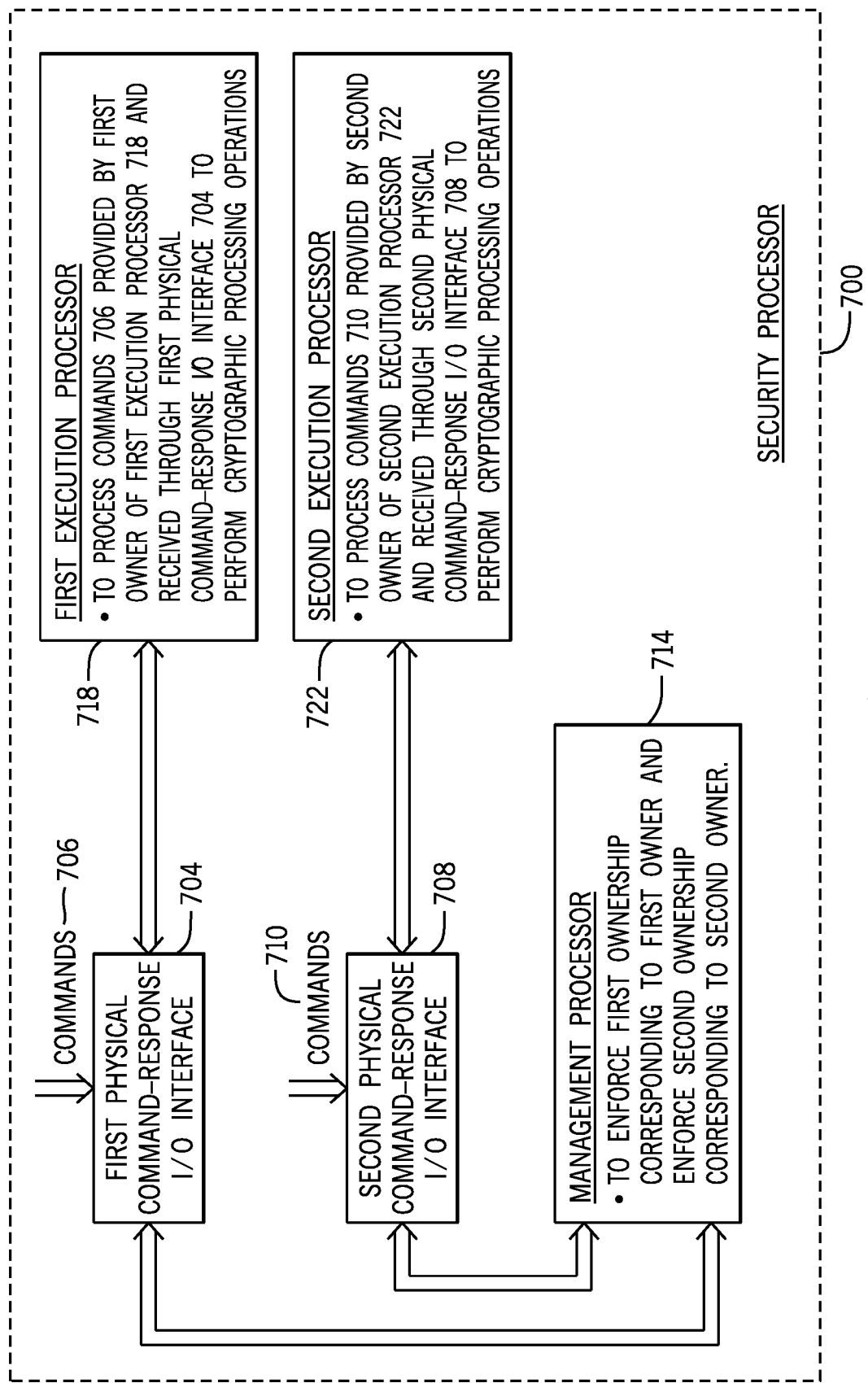
FIG. 7 is a schematic diagram of a security processor having multiple physical command-response I/O interfaces according to an example implementation.

Referring to FIG. 7, in accordance with example implementations, a security processor 700 includes a plurality of physical command-response I/O interfaces, including a first physical command-response I/O interface 704 and a second physical command-response I/O interface 708. The security processor 700 includes a first execution processor 718 to process commands 706 that are provided by a first owner for the first execution processor 718 and received in the first physical command-response I/O interface 704 to perform cryptographic processing operations. The security processor 700 includes a second execution processor 722 to process commands 710 that are provided by a second owner for the second execution processor 722 and received in the second physical command—response I/O interface 708 to perform cryptographic processing operations. The security processor 700 includes a management processor 714 to enforce a first ownership corresponding to the first owner and enforce a second ownership corresponding to the second owner.

Figure 8:
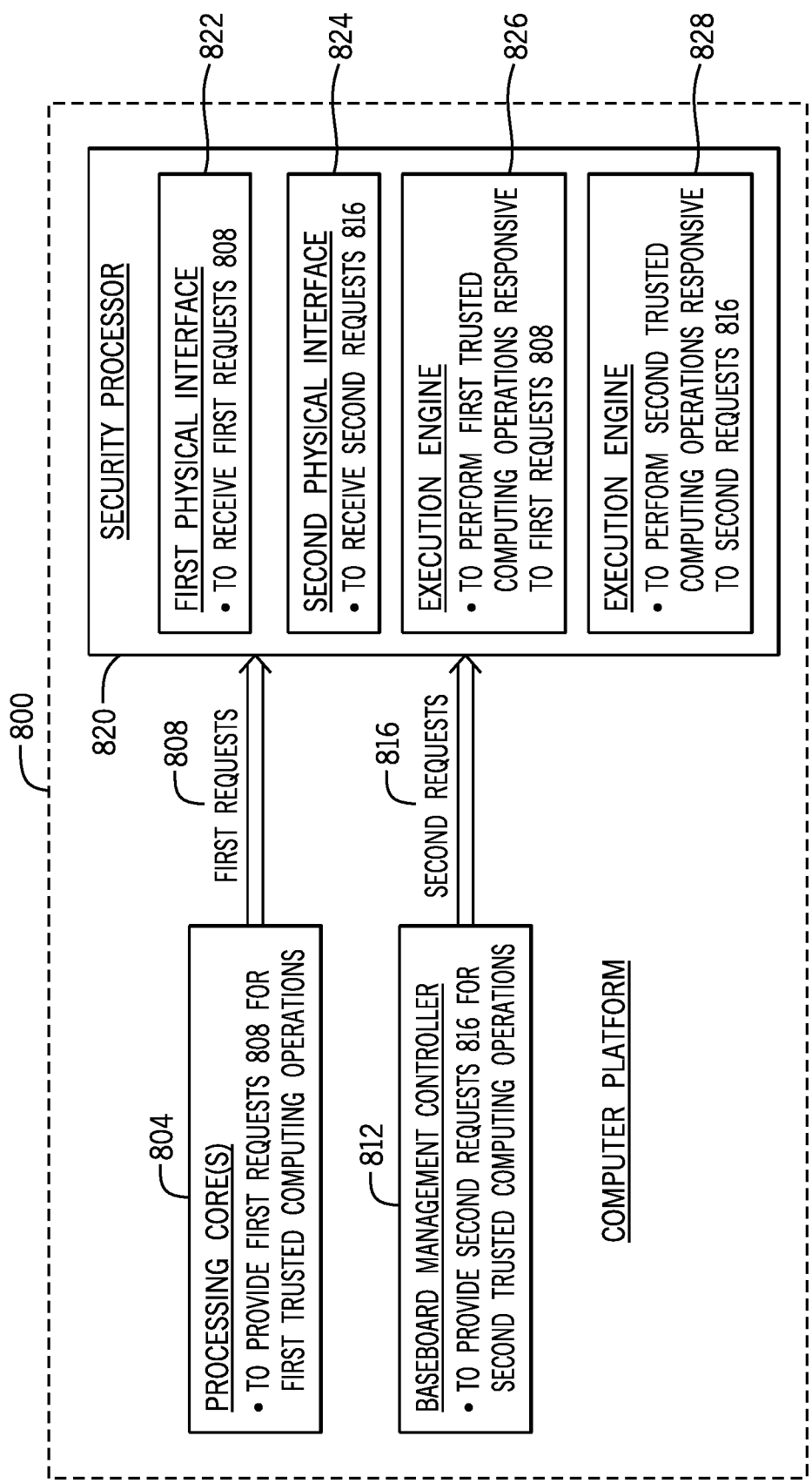
FIG. 8 is a schematic diagram of a computer platform having a security processor that includes physical interfaces to receive requests for trusted computing operations according to an example implementation.

Referring to FIG. 8, in accordance with example implementations, a computer platform 800 includes at least one processing core 804, a baseboard management controller 812 and a security processor 820. The processing core(s) 804 provides first requests 808 for first trusted computing operations. The baseboard management controller 812 provides second requests 816 for second trusted computing operations. The security processor 820 includes a plurality of execution engines, including a first execution engine 826 associated with the first physical interface 822 to perform the first trusted computing operations responsive to the first requests 808 and a second execution engine 828 associated with the second physical interface 824 to perform the second trusted computing operations responsive to the second requests 816. The security processor 820 includes a plurality of physical interfaces including a first physical interface 822 to receive the first requests 808 and a second physical interface 824 to receive the second requests 816.

In accordance with example implementations, receiving the first request in the first physical request interface includes receiving the first request from a main processor of the computer system. Moreover, receiving the second request in the second physical request interface includes receiving the second request from an entity of the computer system other than the main processing core. A particular advantage is that a security processor may be used in relatively complex computer architectures in which multiple requestors may concurrently use the security processor.

In accordance with example implementations, receiving the second request in the second physical request interface includes receiving the second request from a baseboard management controller. A particular advantage is that a security processor may be used in relatively complex computer architectures in which multiple requestors may concurrently use the security processor.

In accordance with example implementations, a first plurality of requests may be received in the first physical request interface and at least one of operating system instructions or firmware runtime instructions may be executed to generate the first plurality of requests. A second plurality of requests may be received in the second physical request interface, and firmware instructions may be executed on a management controller to generate the second plurality of requests. A particular advantage is that a security processor may be used in relatively complex computer architectures in which multiple requestors may concurrently use the security processor.

In accordance with example implementations, executing the firmware instructions on the management controller includes executing firmware instructions on at least one of a baseboard management controller or a smart input/output (I/O) processor. A particular advantage is that a security processor may be used in relatively complex computer architectures in which multiple requestors may concurrently use the security processor.

In accordance with example implementations, responsive to a boot of the computer platform, configuring a use of at least one of the first physical request interface or the second physical request interface. The configuration may be locked. A particular advantage is that a multiple interface security processor may be configured by boot services firmware.

In accordance with example implementations, in response to a request, the security processor provides a response that includes data representing the configuration. A particular advantage is that users of the security processor may be informed as to the security processor's configuration.

In accordance with example implementations, the configuring includes configuring the use of at least one of the first physical request interface or the second physical request interface for a corresponding hierarchy of a plurality of hierarchies of the security processor. A particular advantage is that different configuration policies may be established for different corresponding hierarchies of the security processor.

In accordance with example implementations, a resource of the security processor may be shared among the first and second physical request interfaces. The sharing may include the security processor allowing a first access corresponding to a first access type via the first physical request interface and the second physical request interface; the security processor allowing a second access corresponding to a second access type via one of the first physical request interface and the second physical request interface; and the security processor preventing a third access corresponding to the second access type via the other of the first physical request interface and the second physical request interface. A particular advantage is that access rights of different requestors may be independently controlled.

In accordance with example implementations, sharing the resource further includes sharing a measurement register of the security processor. The first access type corresponds to a command to read a content of the measurement register. The second access type corresponds to a command to extend the content of the measurement register. A particular advantage is a particular measurement register may be extended by a management controller and not be extended by other security processor requestors.

In accordance with example implementations, sharing the resource includes sharing a measurement register of the security processor and allowing a baseboard management controller to extend the management register with an initial boot block measurement. A particular advantage is a particular measurement register may be extended by a baseboard management controller and not be extended by other security processor requestors.

In accordance with example implementations, the security processor controls access to a security object responsive to a consensus of authorizations received via the plurality of physical request interfaces. A particular advantage is that access to certain security objects may be regulated independently by multiple requestors.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
a first tenant of a plurality of tenants communicating with a security processor of a computer platform via a first physical request interface of the security processor to acquire ownership of a first command execution engine of the security processor associated with the first physical request interface;
a second tenant of the plurality of tenants communicating with the security processor via a second physical request interface of the security processor to acquire ownership of a second command execution engine of the security processor associated with the second physical request interface;
the security processor receiving a first request from the first tenant in the first physical request interface;
the security processor receiving a second request from the second tenant in the second physical request interface; and
the first command execution engine processing the first request and the second command execution engine processing the second request to perform corresponding trusted computing operations.

2. The method of claim 1, wherein:
receiving the first request in the first physical request interface comprises receiving the first request from a main processing core of the computer system; and
receiving the second request in the second physical request interface comprises receiving the second request from an entity of the computer system other than the main processing core.

3. The method of claim 2, wherein receiving the second request in the second physical request interface comprises receiving the second request from a baseboard management controller.

4. The method of claim 1, further comprising:
receiving a first plurality of requests in the first physical request interface, wherein the first plurality of requests include the first request;
executing at least one of operating system instructions or firmware runtime instructions to generate the first plurality of requests;
receiving a second plurality of requests in the second physical request interface, wherein the second plurality of requests include the second request; and
executing firmware instructions on a management controller to generate the second plurality of requests.

5. The method of claim 4, wherein executing the firmware instructions on the management controller comprises executing firmware instructions on at least one of a baseboard management controller or a smart input output (I/O) processor.

6. The method of claim 1, further comprising:
responsive to a boot of the computer system, configuring a use of at least one of the first physical request interface or the second physical request interface; and
locking the configuration.

7. The method of claim 6, further comprising:
in response to a request, the security processor providing a response comprising data representing the configuration.

8. The method of claim 6, wherein the configuring comprises:
configuring the use of at least one of the first physical request interface or the second physical request interface for a corresponding hierarchy of a plurality of hierarchies of the security processor.

9. The method of claim 1, further comprising:
sharing a resource of the security processor among the first physical request interface and the second physical request interface, wherein the sharing comprises:
the security processor allowing a first access corresponding to a first access type via the first physical request interface and the second physical request interface;
the security processor allowing a second access corresponding to a second access type via one of the first physical request interface and the second physical request interface; and
the security processor preventing a third access corresponding to the second access type via the other of the first physical request interface and the second physical request interface.

10. The method of claim 9, wherein:
sharing the resource further comprises sharing a measurement register of the security processor;
the first access type corresponds to a command to read a content of the measurement register; and
the second access type corresponds to a command to extend the content of the measurement register.

11. The method of claim 9, wherein sharing the resource comprises:
sharing a measurement register of the security processor; and
allowing a baseboard management controller to extend the measurement register with an initial integrity measurement.

12. The method of claim 9, wherein sharing the resource comprises sharing a memory of the shared processor other than a memory to store a measurement.

13. The method of claim 1, further comprising:
the security processor controlling access to a security object responsive to a consensus of authorizations received via the plurality of physical request interfaces.

14. A security processor comprising:
a plurality of physical command-response input/output (I/O) interfaces comprising a first physical command-response I/O interface and a second physical command-response I/O interface;
a first execution processor to process commands provided by a first owner of the first execution processor and received in the first physical command-response I/O interface to perform cryptographic processing operations;
a second execution processor to process commands provided by a second owner of the second execution processor and received in the second physical command-response I/O interface to perform cryptographic processing operations; and
a management processor to enforce a first ownership corresponding to the first owner and enforce a second ownership corresponding to the second owner.

15. The security processor of claim 14, further comprising a shared resource, wherein the management processor to:

allow, for the first owner, a first access to the shared resource corresponding to a first access type;

allow, for the second owner, a second access to the shared resource corresponding to the first access type;

allow, for the first owner, a third access to the shared resource corresponding to a second access type; and prevent, for the second owner, a fourth access to the shared resource corresponding to the second access type.

16. The security processor of claim 15, wherein:

the shared resource comprises a platform configuration register;

the first access comprises an access to read a content of the platform configuration register;

the second access comprises an access to read the content of the platform configuration register;

the third access comprises an access to extend the content of the platform configuration register; and the fourth access comprises an access to extend the content of the platform configuration register.

17. A computer system comprising:

at least one processing core to provide first requests for first trusted computing operations;

a baseboard management controller to provide second requests for second trusted computing operations; and a security processor comprising:
  a plurality of execution engines to perform the first and second trusted computing operations responsive to the first requests and the second requests, wherein the plurality of execution engines comprises a first execution engine and a second execution engine; and
  a plurality of physical interfaces comprising:
    a first physical interface associated with the first execution engine to receive the first requests; and
    a second physical interface associated with the second execution engine to receive the second requests.

18. The computer system of claim 17, wherein the at least one processing core to execute firmware to boot the computer system and to control enablement of the second interface.

19. The system of claim 17, wherein the at least one processing core to execute Unified Extensible Firmware Interface (UEFI) instructions and operating system instructions to provide the first requests.

20. The system of claim 17, wherein the security processor comprises a trusted platform module (TPM).

* * * * *